US010772391B2

(12) United States Patent
Shimizu et al.

(10) Patent No.: US 10,772,391 B2
(45) Date of Patent: Sep. 15, 2020

(54) FIRE-RETARDANT AND LOW-FUMING MOLDED HOOK FASTENER

(71) Applicants: Kuraray Fastening Co., Ltd., Osaka-shi (JP); Kuraray Co., Ltd., Kurashiki-shi (JP)

(72) Inventors: Atsushi Shimizu, Fukui (JP); Munenori Kumagai, Tokyo (JP); Nobuhiro Koga, Okayama (JP)

(73) Assignees: KURARAY FASTENING CO., LTD., Osaka-Shi (JP); KURARAY CO., LTD., Kurashiki-Shi (JP)

( * ) Notice: Subject to any disclaimer, the term of this patent is extended or adjusted under 35 U.S.C. 154(b) by 27 days.

(21) Appl. No.: 16/334,888

(22) PCT Filed: Sep. 21, 2017

(86) PCT No.: PCT/JP2017/034007
§ 371 (c)(1),
(2) Date: Mar. 20, 2019

(87) PCT Pub. No.: WO2018/061955
PCT Pub. Date: Apr. 5, 2018

(65) Prior Publication Data
US 2020/0015552 A1 Jan. 16, 2020

(30) Foreign Application Priority Data
Sep. 30, 2016 (JP) .................. 2016-193524

(51) Int. Cl.
*A44B 13/00* (2006.01)
*B64C 1/06* (2006.01)
(Continued)

(52) U.S. Cl.
CPC .......... *A44B 13/0023* (2013.01); *B64C 1/066* (2013.01); *A44B 18/0092* (2013.01)

(58) Field of Classification Search
CPC ............ A44B 13/0023; A44B 18/0061; A44B 18/0049; A44B 18/0092; B64C 1/066
See application file for complete search history.

(56) References Cited

U.S. PATENT DOCUMENTS

2003/0126724 A1* 7/2003 Kono ................. A44B 18/0019
24/451
2004/0258902 A1* 12/2004 Seth .................... A61F 13/0273
428/315.7
(Continued)

FOREIGN PATENT DOCUMENTS

EP 1486606 A1 12/2004
JP 2010-110537 A 5/2010
(Continued)

OTHER PUBLICATIONS

International Search Report dated Nov. 28, 2017 in PCT/JP2017/034007 filed Sep. 21, 2017.
(Continued)

Primary Examiner — Robert Sandy
Assistant Examiner — Rowland Do
(74) Attorney, Agent, or Firm — Element IP, PLC

(57) ABSTRACT

The present invention relates to a molded hook fastener having excellent fire retardancy and low fuming property, and having a substrate and a large number of engaging elements projecting from a surface of the substrate, wherein both the substrate and the engaging elements contain a resin composition in which a polyester-based elastomer resin (A) and a polyetherimide-based resin (B) are mixed with a weight ratio (A)/(B) in a range of 2/98 to 70/30.

7 Claims, 4 Drawing Sheets

(51) Int. Cl.
   *C08L 67/00*     (2006.01)
   *C08L 83/08*     (2006.01)
   *A44B 18/00*     (2006.01)

(56) References Cited

U.S. PATENT DOCUMENTS

| | | | |
|---|---|---|---|
| 2006/0008664 A1* | 1/2006 | Wakabayashi | C08K 3/04 428/516 |
| 2012/0015184 A1 | 1/2012 | Endo et al. | |
| 2013/0123437 A1 | 5/2013 | Endo et al. | |
| 2015/0069654 A1 | 3/2015 | Endo et al. | |
| 2015/0167199 A1 | 6/2015 | Endo et al. | |
| 2015/0313320 A1 | 11/2015 | Mahe | |
| 2017/0066181 A1* | 3/2017 | Poulakis | B29C 66/723 |
| 2018/0142079 A1* | 5/2018 | Chen | C08L 67/02 |

FOREIGN PATENT DOCUMENTS

| | | |
|---|---|---|
| JP | 2012-97382 A | 5/2012 |
| JP | 2016-500034 A | 1/2016 |
| WO | WO 2010/109962 A1 | 9/2010 |
| WO | WO 2012/014713 A1 | 2/2012 |

OTHER PUBLICATIONS

Extended European Search Report dated Jun. 5, 2020 in Patent Application No. 17855910.0, 6 pages.

* cited by examiner

FIRE-RETARDANT AND LOW-FUMING MOLDED HOOK FASTENER

TECHNICAL FIELD

The present invention relates to a molded hook fastener having fire retardancy, excellent in low fuming property and further in engaging force, and is suitably used as a fitting tool, particularly in the fields requiring a high degree of low fuming property and fire retardancy as well as excellent engaging force of an aircraft and the like.

BACKGROUND ART

Polyetherimide (hereinafter referred to as PEI) based resin is superior in mechanical properties, fire retardancy, heat resistance, fuming resistance and the like, so polyetherimide-based resin is used as super engineering plastics of films, fibers or injection molding materials for electric parts, automotive parts, etc.

Recently, in the fields of aircraft, ships, automobiles and the like, a method of using a hook-and-loop fastener as a means for covering the inner surface by attaching an interior material such as a ceiling material, a wall material, a floor material or the like to a skeletal structure such as a fuselage, a hull or a car body has been proposed. In addition, a method of using a hook-and-loop fastener as a means for fixing a skin material covering a cushion material to the surface of the cushion material has been proposed also for the seat sheet used in these fields.

In addition, extremely high degree of fire retardancy and low fuming property are required for hook-and-loop fasteners used in such fields, particularly in the field of aircraft, and the PEI-based resins are expected as few resins capable of meeting these demands.

For example, the following Patent Literature 1 describes that a cloth obtained by weaving a PEI-based fiber is used for a hook-and-loop fastener. However, since the hook fastener obtained by weaving the PEI-based fiber cannot obtain a sufficient engaging force because the hook-shaped engaging element easily extends, a hook fastener capable of obtaining a higher engaging force is required.

Hook fasteners are roughly divided into two types: woven hook fasteners and molded hook fasteners. Further, the molded hook fasteners are largely classified into one manufactured by an injection molding method and one manufactured by an extrusion molding method.

The woven hook fastener is prepared by weaving a monofilament fiber for engaging element into a base fabric, projecting a large number of the monofilament fibers on the surface of the base cloth in a loop shape, fixing the loop shape under heat treatment, and then cutting one leg of the loop into a hook-shaped engaging element or melting a tip of the loop to form a mushroom-like engaging element.

On the other hand, among the means for obtaining a hook fastener, the injection molding method is a method in which a molten resin is allowed to flow over the surface of a mold having a large number of hook-shaped or Y-shaped cavities and then solidified, after which a resin sheet is peeled off from the mold to obtain a hook-and-loop fastener. In the other extrusion molding method, a resin is extruded from a nozzle having a slit having the same cross-sectional shape as the substrate and the engaging element present on the surface of the substrate into the form of a tape having a substrate and projections for the engaging element present on the surface of the substrate. Then, a cut is made in the projection for the engaging element in the tape width direction, and then the cut is expanded so as to widen the cut line to make the projections into a row of the engaging elements.

Among these hook fasteners, in the case of a woven hook fastener, a monofilament is woven into a base fabric, so that a big problem with respect to the moldability of the resin does not arise. However, in the case of the molded hook fastener, there is a disadvantage of problems such that it is difficult to flow a resin faithfully into a narrow cavity; engaging elements are easy to be cut when forcibly pulling out from the cavity after solidifying the resin; when pulled out, the engaging element is stretched and does not become a hook shape; it is difficult to discharge the resin faithfully to the shape of a thin slit for engaging elements; and furthermore, the projection is broken at the time of cutting or the tape-shaped material is easily cut at the time of stretching. Therefore, the moldability of the resin is extremely important.

The present inventors have found that when a molded hook fastener is manufactured by an injection molding method or an extrusion molding method of a PEI-based resin as a material, a molded hook fastener made of a PEI-based resin was manufactured with an expectation such that the resulting molded hook fastener is higher than the woven hook fastener in the engaging force.

However, when a molded hook fastener is manufactured using a PEI-based resin as a molding material, a molded hook fastener having a desired engaging force could not be obtained because the resulting molded hook fastener did not face a direction such that the male engaging element can engage with the engaging partner, or there were many engaging elements which were cut in the middle of the engaging element.

It is conceivable to improve the moldability by mixing a resin having excellent moldability with a PEI-based resin as a means for solving the low engaging force caused by poor moldability of such PEI-based resin. However, when most of the resin is blended in an amount necessary for improving moldability with the PEI-based resin, the fire retardancy and low fuming property of the PEI-based resin of the resulting molded hook-and-loop fastener has remarkably disappeared, so that necessary fire retardancy or low fuming property could not be satisfied at all. In addition, among the resins, there are also many cases where further deterioration of the moldability of the PEI-based resin occurred by mixing.

CITATION LIST

Patent Literature

Patent Literature 1: WO 2010/109962

SUMMARY OF INVENTION

An object of the present invention is to obtain a molded hook-and-loop fastener which solves poor moldability of a PEI-based resin without substantially impairing excellent fire retardancy and low fuming property of the PEI-based resin and which is excellent in fire retardancy and low fuming property, as well as excellent in engaging force.

That is, one aspect of the present invention is a molded hook fastener having: a substrate; and a large number of engaging elements projecting from a surface of the substrate, wherein both the substrate and the engaging elements contain a resin composition in which a polyester-based elastomer resin (A) and a PEI-based resin (B) are mixed with a weight ratio (A)/(B) in a range of 2/98 to 70/30.

DESCRIPTION OF EMBODIMENTS

Figure 1:
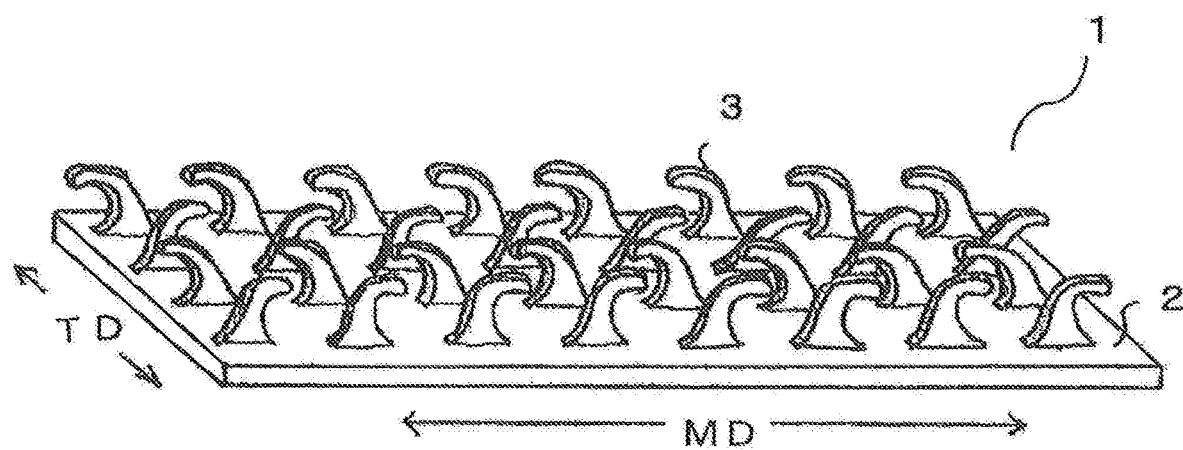
FIG. 1 is a perspective view of a preferred example of a molded hook fastener of the present invention.

The molded hook fastener according to the present embodiment is a molded hook-and-loop fastener having a substrate and a large number of engaging elements projecting from a surface of the substrate, wherein both the substrate and the engaging elements contain a resin composition in which a polyester-based elastomer resin (A) and a PEI-based resin (B) are mixed with a weight ratio (A)/(B) in a range of 2/98 to 70/30.

As described above, it is considered that the problem such that the engaging element is cut or the engagement protrusions of the engaging element are not oriented in such a direction as to being possible to engage with each other, which is caused by poor moldability when the PEI-based resin (B) is used as the molding material of the molded hook fastener, can be solved by mixing a specific resin called polyester-based elastomer (A).

The polyester-based elastomer (A) is one type of thermoplastic elastomer, but besides polyester-based elastomer, there are many types such as polyurethane-based elastomer, polyolefin-based elastomer, styrene-based elastomer, polyamide-based elastomer, and polyvinyl chloride-based elastomers. Among them, only the polyester-based elastomer can greatly improve the moldability without greatly impairing the low fuming property and fire retardancy of the PEI-based resin.

Although the reason is not always clear, since the polyester-based elastomer is remarkably excellent in compatibility with the PEI-based resin and as a result, such an elastomer can be dispersed to an extremely fine state. Such a finely dispersed state greatly improves the poor moldability of the PEI-based resin and does not greatly impair the low fuming property and fire retardancy of the PEI-based resin.

Therefore, according to the present embodiment, by mixing the polyester-based elastomer with the PEI-based resin, the problem of moldability of the PEI-based resin can be solved without greatly impairing characteristic points of the PEI-based resin, such as fire retardancy and low fuming property.

Since the polyester-based elastomer does not have fire retardancy and low fuming property, though such properties are improved as compared with other elastomer resins but when the mixing ratio of the polyester-based elastomer resin is increased, there is a concern such that the characteristic point of the PEI-based resin, such as fire retardancy and low fuming property, gradually deteriorates. In that case, it is possible to reduce a great deterioration of fire retardancy and low fuming property by adjusting the blending ratio of the PEI-based resin and the polyester-based elastomer or by adding a specific fire retardant to the polyester-based elastomer resin.

As described above, the conventional molded hook fastener could not satisfy the required performance for the aircraft field requiring particularly strict standards. However, the molded hook fastener of the present embodiment was possible to pass the requirements for fire retardancy, low fuming property, and engaging force.

Hereinafter, embodiments of the present invention will be described specifically, but the present invention is not limited thereto.

The hook fastener of the present embodiment basically contains a PEI-based resin (B) and a polyester-based elastomer (A), and preferably further contains a bromine-based or phosphorus-based organic fire retardant in addition to such (A) and (B).

The PEI-based resin (B) used in the present embodiment will be described in detail. The PEI-based resin is a polymer containing an aliphatic, alicyclic or aromatic ether unit and a cyclic imide as a repeating unit and is not particularly limited as long as the polymer is amorphous and has a melt moldability.

As the specific PEI-based resin (B), a resin having a unit represented by the following general formula is suitably used. In the formula, R1 is a divalent aromatic residue having 6 to 30 carbon atoms, R2 is a divalent organic group selected from the group consisting of a divalent aromatic residue having 6 to 30 carbon atoms, an alkylene group having 2 to 20 carbon atoms, a cycloalkylene group having 2 to 20 carbon atoms, and a polyorganosiloxane group blocked and terminated at both ends with an alkylene group having 2 to 8 carbon atoms.

[Formula 1]

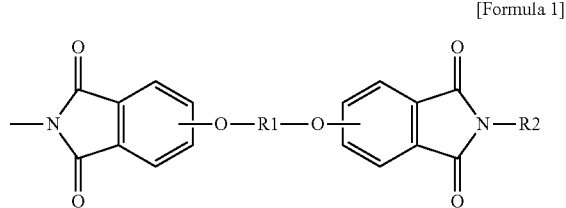

As specific examples of R1 and R2, those having an aromatic residue or an alkylene group represented by the following formula (for example, m=2 to 10) are preferably used.

[Formula 2]

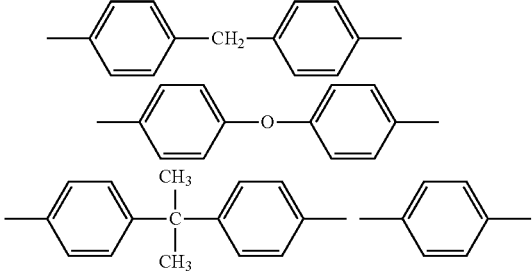

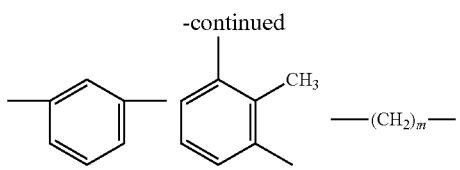

In the present embodiment, from the viewpoint of amorphicity, melt moldability and cost, it is preferable to use a condensate between 2,2-bis[4-(2,3-dicarboxyphenoxy)phenyl] propane dianhydride and m-phenylene diamine.

Such a PEI-based resin is commercially available as "ULTEM" (registered trademark) from SAVIC Innovative Plastics Corporation.

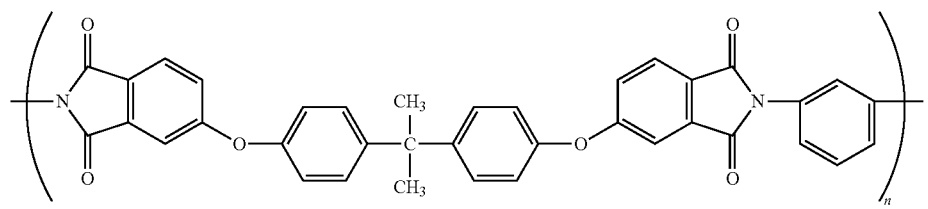

[Formula 3]

More preferably, the PEI-based resin is a copolymer of polysiloxane and polyetherimide. Such a polysiloxane-polyetherimide copolymer is obtained by polymerizing the polyetherimide wherein 20 to 50 mol % of the diamine component is replaced with a polyorganosiloxane whose both terminals are blocked with an alkylene group having 2 to 8 carbon atoms having an amino group at the terminal, that is, in the above formula 1, 20 to 50% of R2 is a polyorganosiloxane group in which the chain is terminated with an alkylene group having 2 to 8 carbon atoms.

By using this polysiloxane-polyetherimide copolymer as the PEI-based resin, it is possible to more uniformly mix with the polyester elastomer resin, thereby to improve moldability, further improve the fire retardancy and low fuming property of the PEI-based resin, and thus this is even more preferable.

Such a siloxane-polyetherimide copolymer is commercially available as "SILTEM" from the SABIC Innovative Plastics Corporation. In this embodiment, the PEI-based resin also includes a siloxane-polyetherimide copolymer.

The molecular weight of the PEI-based resin (B) used in the present embodiment is not particularly limited but considering the mechanical properties and process passability of the resulting molded hook fastener, the molecular weight preferably satisfies a melt viscosity of 5000 poise or less at 390° C. and a shear rate of 1200 sec-1. Further, from that viewpoint, it is desirable that the weight average molecular weight (Mw) is about 1000 to 80000. A polymer having a high molecular weight is preferred since the molded product is excellent in strength and heat resistance, but Mw is more preferably from 10000 to 50000 from the viewpoints of resin production cost, molding cost and the like.

The polyester-based elastomer (A) to be mixed with the PEI-based resin is one obtained by copolymerizing polyoxytetramethylene glycol having a number average molecular weight of 500 to 3000 with a resin having a butylene terephthalate unit as a main repeating unit. The polyester-based elastomer (A) of the present embodiment is a resin having sufficient elastic properties as compared with other general elastomer resins such as polyurethane elastomers, styrene elastomers, olefin elastomers and the like despite its high modulus of elasticity. In the present embodiment, the proportion of [poly(oxytetramethylene)] terephthalate group in the polyester-based elastomer is preferably in the range of 40 to 70% by weight, more preferably in the range of 50 to 60% by weight.

In the molded hook fastener of the present embodiment, both the substrate and the engaging element are made of a resin composition in which the polyester-based elastomer resin (A) and the PEI-based resin (B) are mixed at a specific weight ratio.

In the present embodiment, the weight ratio (A)/(B) of the polyester-based elastomer resin (A) and the PEI-based resin (B) is in the range of 2/98 to 70/30. When the mixing ratio of the polyester-based elastomer (A) is less than 2/98, the moldability is not improved, and the engaging elements having high engaging force cannot be obtained because there are many engaging elements which are missing or bent in a direction in which the engaging elements cannot be engaged. On the contrary, when the weight ratio (A)/(B) is more than 70/30, almost no fire retardancy and low filming property possessed by the PEI-based resin can be developed. Preferably, the weight ratio (A)/(B) ranges from 3/97 to 60/40. When the resin composition containing the polyester-based elastomer (A) and the PEI-based resin (B) does not contain a bromine-based or phosphorus-based organic fire retardant, the weight ratio (A)/(B) is preferably 2/98 to 20/80.

In this embodiment, a bromine-based or phosphorus-based organic fire retardant may be added to a mixture of the polyester-based elastomer (A) and the PEI-based resin (B). In this case, the addition amount of the fire retardant is 5 to 40% by weight based on the polyester elastomer (A), and in that case, the weight ratio (A)/(B) is preferably in the range of 10/90 to 60/40.

Examples of the bromine-based organic fire retardant include brominated polycarbonate, brominated epoxy, brominated polyphenylene ether, brominated polystyrene, brominated bisphenol A, brominated bisphenol type copolymerized polycarbonate, brominated polyphenylene phthalimide, pentabromobenzyl acrylate and the like.

Examples of the phosphorus-based organic fire retardant include phenylphosphonic acid, phenylphosphinic acid, diphenylphosphonic acid, polyphosphonate, dialkylpentaerythritol diphosphite, dialkylbisphenol A diphosphite, and the like.

From the viewpoint of dispersibility in the polyester-based elastomer (A), these fire retardants are preferably organic compounds, and in the case of inorganic compounds, they are inferior in dispersibility, resulting in failure to obtain effect of addition, and the moldability also deteriorates in some cases.

In the resin contained in the molded hook fastener of the present embodiment, other resins, stabilizers, additives, coloring agents, reinforcing materials or the like may be added within a range not significantly impairing the performance of the molding material, in addition to the polyester-based elastomer, the PEI-based resin, the bromine-based fire retardant, and the phosphorus-based fire retardant.

Using such a molding material, the molded hook fastener of the present embodiment is manufactured. For example, pellets of the polyester-based elastomer (A) and pellets of the PEI-based resin (B) optionally containing the above-mentioned organic fire retardant and the like are dry-blended and then melt-kneaded in a biaxial kneader, extruded in a strand form, and cut to prepare pellets made of a mixed resin.

Next, using the pellets made of the mixed resin, a molded hook fastener is manufactured according to, for example, the method described in International Publication No. WO 87/06522. Specifically, a ring-shaped mold piece in which the shape (wave shape) of a male engaging element is engraved on the outer circumference, a metal ring not engraved in such a shape, a ring-shaped mold piece in which a wave shape whose wave faces a direction opposite to the above-mentioned wave shape is engraved on the outer circumference, and a metal ring not engraved into such a shape are overlapped in order, thereby to first prepare a mold roller having numerous wave-shaped cavities on the outer circumference and numerous wave-shaped cavities with opposite wave direction on the surface.

Next, a melt of the pellets made of the mixed resin is extruded into a gap between the roller and another drum roller which is located at a position opposed to the roller and pressed to fill the cavity with the mixed resin, and the mixed resin in the cavity is cooled and solidified by a refrigerant which is constantly circulated in the roller while the mold roller is rotating. Then, the mixed resin is stretched by a nip roller whose clearance is adjusted so as to be the substrate thickness of the resulting molded hook fastener, and a cooled sheet is pulled off from the surface of the mold roller.

The resulting molded hook fastener (1) has a shape as shown in FIG. 1. That is, a large number of wave-shaped engaging elements (3) are arranged in a row on the surface of a substrate (2), and each engaging element is composed of a stem portion projecting from the substrate and a protrusion portion projecting from the tip or middle of the stem in the direction of the engagement element row. In FIG. 1, MD represents a sheet length direction, and CD represents a direction perpendicular to the sheet length direction. In each drawing, reference numerals indicate the following. 1: Molded hook fastener, 2: Substrate, 3: Engaging element.

Then, preferred is a molded hook fastener wherein protrusion portions of engaging elements present in same engaging element rows project in the same projecting direction, and protrusion portions of engaging elements belonging to at least one of the engaging element rows adjacent to the engaging element row project in a projecting direction opposite to the projecting direction. In particular, in FIG. 1, the protrusion portions of the engaging elements present in same engaging element rows project in the same projecting direction, and the protrusion portions of the engaging elements in the adjacent engaging element rows project in a projecting direction opposite to the projecting direction. By having such a shape and projecting direction, a high engaging force of such a fastener can be obtained.

Figure 2:
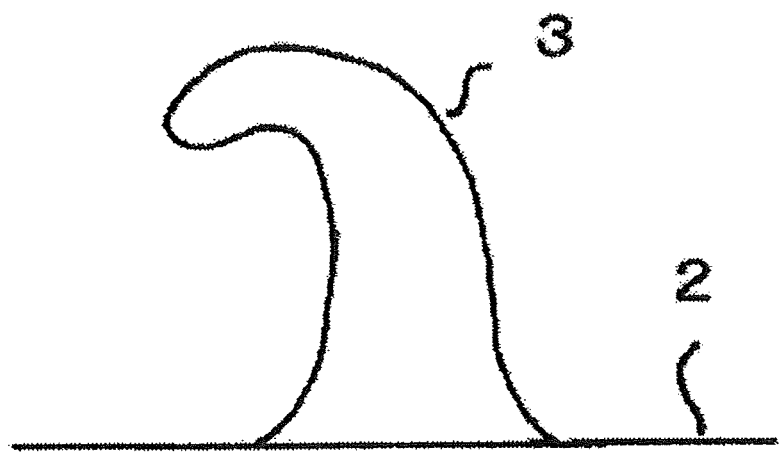
FIG. 2 is a side view showing an example of a shape of an engaging element of a molded hook fastener of the present invention.
Figure 3:
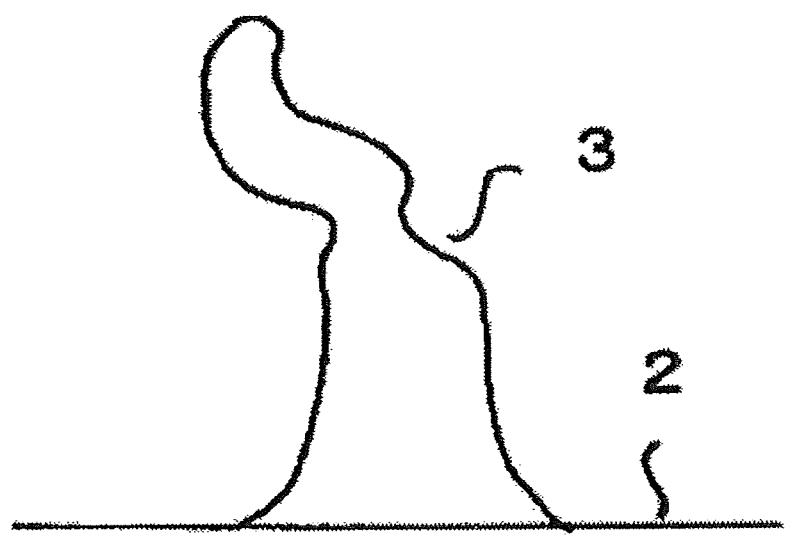
FIG. 3 is a side view showing an example of a shape of an engaging element obtained when the moldability is inferior.
Figure 4:
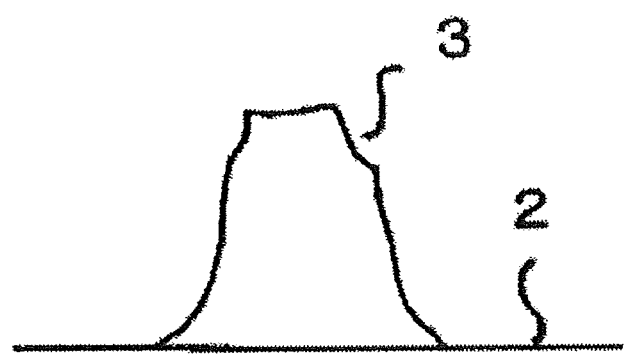
FIG. 4 is a side view showing another example of a shape of an engaging element obtained when the moldability is inferior.

FIG. 2 schematically shows a case where the engaging element of FIG. 1 is viewed from the side. In the case where the engaging element is made of a mixture of the polyester-based elastomer (A) and the PEI-based resin (B) of the present embodiment, the engaging element (3) becomes a complete wave shape as shown in FIG. 2. On the other hand, in the case of an engaging element made of 100% of the PEI-based resin, as shown in FIG. 3, the engaging element (3) is bent midway and does not have such a shape as to engage, or as shown in FIG. 4, the engaging element is cut in the middle, resulting in having no engaging capability.

The shape of the engaging element may be any of a Y shape, a T shape, an arrowhead shape and the like in addition to the wave shape as shown in FIG. 1, but the wave shape as shown in FIG. 1 and FIG. 2 is preferable because the desired engaging element shape is substantially faithfully and easily can be obtained.

In addition to the injection molding method in which the molten resin is filled in the cavity as described above and peeled off to manufacture the molded hook fastener, such a fastener can also be manufactured by a so-called extrusion molding method. Specifically, the molten resin is extruded from a nozzle having a slit having the same cross-sectional shape as that of the substrate and the engaging element present on the surface of the substrate and is solidified to firstly obtain a tape-shaped object having a substrate and projections for engaging elements present on the surface thereof. Next, a slit is formed in the projection for engaging elements in the tape width direction, and the slit is expanded to widen the slit so that the projection forms an independent row of engaging elements. In general, when the engaging element is composed of 100% of the PEI-based resin, the projection for engaging elements may not be extruded faithfully, or the projection or the engaging element may be easily broken, or the tape may be cut during the manufacturing process, but such problems will be greatly improved by the present invention.

In the present embodiment, the thickness of the substrate is preferably 0.1 to 1.0 mm, the height of the engaging element is preferably 0.2 to 3.0 mm from the substrate surface, and the engaging element density is preferably 30 to 250 elements/cm$^2$. The interval between adjacent engaging elements belonging to the same engaging element row is preferably 0.3 to 3.0 mm, and the interval between adjacent engaging element rows is preferably 0.1 to 3.0 mm. As for the thickness of the engaging element, a cross sectional area at the middle portion of the height is preferably 0.01 to 2.0 mm$^2$ and a diameter as the inner diameter of the pocket which becomes a wave-shaped hooked portion is preferably 0.05 to 0.8 mm.

The molded hook fastener of the present embodiment is superior in fire retardancy, low fuming property, and engaging force, and is suitable for use in ceiling materials, wall materials and flooring materials of buildings where many people gather, such as schools, shopping centers, theaters, gymnasiums, etc. Particularly in the field of vehicles such as aircraft, ships, automobiles, trains and the like, such a field is a field that fire accident causes a great disaster, so the molded hook fastener is used as a fixing material for ceiling materials, wall materials and floor materials, and is furthermore suitable as a means for covering and fixing a skin material of the seat in the same field or for covering and fixing the surface of the seat cushioning material. Among such fields, the molded hook fastener is suitably used for an aircraft.

Although the present specification discloses technologies of various aspects as described above, the main technologies among them are summarized below.

That is, the molded hook fastener according to one aspect of the present invention is characterized by a molded hook-and-loop fastener having a substrate and a large number of engaging elements projecting from a surface of the substrate, wherein both the substrate and the engaging elements contain a resin composition in which a polyester-based elastomer resin (A) and a PEI-based resin (B) are mixed in a weight ratio (A)/(B) of 2/98 to 70/30.

According to the above constitution, it is possible to solve the problem of low moldability possessed by the PEI-based resin with almost no impairment of excellent fire retardancy and low fuming property possessed by the PEI-based resin, and to provide a molded hook-and-loop fastener excellent in fire retardancy and low fuming property as well as excellent in engaging force.

In such a molded hook-and-loop fastener, it is preferable that the bromine-based or phosphorus-based organic fire retardant is not added to the resin composition and the weight ratio (A)/(B) is in the range of 2/98 to 20/80. It is also preferable that in the molded hook-and-loop fastener described above, a bromine-based or phosphorus-based organic fire retardant is added to the resin composition, and the addition amount thereof is 5 to 40% by weight with respect to (A), and the weight ratio (A)/(B) is in the range of 10/90 to 60/40.

With such a constitution, it is considered that fire retardancy and low fuming property can be improved more reliably.

Preferably, in the molded hook-and-loop fastener, the PEI-based resin is a polysiloxane-polyetherimide copolymer. As a result, it is considered that more uniform mixing of the PEI-based resin and the polyester elastomer resin becomes possible, so that the moldability of the PEI-based resin is improved, and the fire retardancy and the low fuming property of the PEI-based resin are further improved.

Further, in the above molded hook-and-loop fastener, it is preferable that a large number of engaging elements are arranged in a row on the surface of a substrate and each engaging element contains a stem portion projecting from the substrate and a protrusion portion projecting in the direction of the engaging element row from the tip or middle of the stem portion. In this case, it is preferable that protrusion portions of engaging elements present in same engaging element rows project in the same projecting direction, and protrusion portions of engaging elements belonging to at least one of the engaging element rows adjacent to the engaging element row project in a projecting direction opposite to the projecting direction. With such a constitution, it is considered that an excellent engaging force can be more reliably obtained.

The present invention also encompasses a method of attaching a ceiling material, a wall material or a floor material using the hook-and-loop fastener as a means for attaching a ceiling material, a wall material or a floor material of an aircraft to a structural material of an aircraft.

EXAMPLES

Hereinafter, the present invention will be specifically described with reference to examples. For the purpose of evaluating the engaging performance of the molded hook fastener, Tricot KN-002 (made of nylon, manufactured by Seiren Co., Ltd., urethane resin with back coat, average fiber thickness of 117 dtex, basis weight of 197 g/m$^2$, bulk density of 0.03 g/cm$^3$, loop element length of 1.2 mm) was used as a loop fastener to be engaged as a mating material of the molded hook fastener, and the surface of the Tricot was raised with a card clothing to prepare loop fibers pulled out from the knitted fabric to the knitted fabric surface.

Then, in a state where the obtained molded hook fastener and the loop fastener are aligned in the longitudinal direction, the engaging elements are overlapped and engaged, and a confirmation test was carried out with respect to the peel strength and the shear strength at n=10 each.

Example 1

First, a resin pellet of Hytrel 6377 (manufactured by Du Pont-Toray Co., Ltd.) was used as a polyester-based elastomer resin (A), and a resin pellet of SILTEM STM 1500 (manufactured by SABIC Company), which is a polysiloxane-polyetherimide copolymer, was used as a PEI-based resin (B). The resin pellets were collected so as to have the weight ratio (A)/(B) of 10/90, dry-blended, fed to a vented biaxial kneading extruder TEX 30α (manufactured by The Japan Steel Works, Ltd.) heated to 275° C., melt-kneaded, and extruded into strands, thereby to obtain blended resin pellets with a pelletizer.

A ring-shaped mold piece having a thickness of 0.2 mm and a diameter of 212 mm, in which a cavity having the shape of a wave-shaped engaging element as shown in FIG. 1 was engraved on the outer circumference, a metal ring having a thickness of 0.3 mm and a diameter of 212 mm, in which such a shape is not engraved, a ring-shaped mold piece having a thickness of 0.2 mm and a diameter of 212 mm, in which a wave shape whose wave faces a direction opposite to the wave shape is engraved on the outer circumference, and a metal ring having a thickness of 0.3 mm and a diameter of 212 mm, in which such a wave shape is not engraved on the outer circumference are centered and a plurality of these are overlapped in order, thereby to prepare a mold roller having a width of 150 mm and having, on the outer circumference, a cavity for forming the wave-shaped engaging element and a cavity for forming a wave-shaped engaging element in the opposite direction.

A melt of the resin pellets is extruded into a gap between this metal roller and another drum roller which is located at a position opposed to the roller and the molten resin was pressed onto the surface of the mold roller to fill the cavity with the molten resin. While the mold roller rotates, a refrigerant which is constantly circulated in the roller exchanges heat with the molten resin in the cavity to cool and solidify the molten resin. A nip roller whose clearance is adjusted is passed through the thickness of the substrate of the resulting molded hook fastener, and the molded hook fastener (hook effective width 150 mm) was manufactured by peeling the cooled resin sheet from the mold roller surface.

The resulting hook fastener had a shape as shown in FIG. 1. That is, the male engaging elements are arranged in a row in the longitudinal direction of the tape-shaped substrate, and such rows are present in plural rows in the width direction of the tape-shaped substrate; further the male engaging element existing in the same row rises almost vertically from the substrate, tilts in the longitudinal direction of the tape-shaped substrate halfway, and becomes inclined much more as the inclination increases toward the tip of the engaging element, to form a hooked portion, thereby providing a so-called wave-shaped male engaging element (hereinafter referred to as a wave-shaped engaging element) having a protrusion portion projecting in the substrate length direction (MD direction) from the stem portion as shown in FIGS. 1 and 2, respectively.

The thickness of the substrate is 0.25 mm, the height of the engaging element is 1.0 mm, the thickness of the engaging element is 0.15 mm$^2$ at the middle portion of the height, and the inner diameter of the pocket of the wave-shaped hooked portion is 0.5 mm, the element density of the wave-shaped engaging element is 120 elements/cm$^2$, the interval between adjacent engaging elements belonging to the same engaging element row is 0.5 mm, and the interval between adjacent engaging element rows was 0.3 mm.

The resulting molded hook fastener was evaluated for peel strength, fire retardancy, and fuming property. The results are shown in Table 1. As is clear from Table 1, both the initial peeling and the 2,000 times peeling had sufficient engaging performance required as hook-and-loop fasteners, and both excellent fire retardancy and low fuming property were exhibited. Thus, the molded hook fastener satisfied the required performance when used for fixing the interior material of aircraft.

Examples 2 to 4

A molded hook fastener was manufactured in the same manner as in Example 1 except that in Example 1, the weight ratio of the polyester-based elastomer resin (A) to the PEI-based resin (B) was changed to (A)/(B)=5/95.

Also, a molded hook fastener was manufactured in the same manner as in Example 1 except that in Example 1, resin pellets of Hytrel 6037 (manufactured by Du Pont-Toray Co., Ltd.) containing 30% by weight of a bromine-based organic fire retardant as the polyester-based elastomer resin (A) were used and the weight ratio (A)/(B) of the resin pellets was 50/50 (Example 3).

Further, a molded hook fastener was manufactured in the same manner as in Example 1 except that in Example 1, resin pellets of Hytrel 6037 (manufactured by Du Pont-Toray Co., Ltd.) containing 30% by weight of a bromine-based organic fire retardant as the polyester-based elastomer resin (A) were used and the weight ratio (A)/(B) of the resin pellets was 65/35 (Example 4).

The performances of the molded hook fasteners obtained by these examples are shown in Table 1. Regarding the fire retardancy, the results of the 12-second vertical flame test and the 60-second vertical flame test were described. Regarding the fuming performance, it is required that the fuming density be less than 200 Ds, preferably less than 160 Ds. In Table 1, PES stands for polyester-based elastomer. The PEI resins used are all polysiloxane-polyetherimide copolymers.

As clearly shown in Table 1, all of the molded hook fasteners had excellent engaging performance, fire retardancy, and low fuming property, but the fastener of Example 2 after 2,000 times peeling was slightly inferior to that of Example 1 in view of the engaging performance; the fastener of Example 3 was somewhat inferior to that of Example 1 in terms of peel strength and low fuming property after 2,000 times peeling; and the fastener of Example 4 finally passed in terms of low fuming property.

The molded hook fasteners obtained in these examples satisfy the engagement performance, fire retardancy, and low fuming property defined by the aircraft manufacturer, and could be used for fixing the ceiling material and the wall material, which are interior materials of the aircraft.

Comparative Examples 1 to 4

A molded hook fastener was manufactured in the same manner as in Example 1 except that in Example 1, the hook fastener was manufactured with 100% of the polyester-based elastomer resin (A) without mixing the PEI-based resin at all (Comparative Example 1).

Further, a trial to manufacture a molded hook fastener was performed in the same manner as in Example 1 except that in Example 1, the weight ratio of the polyester-based elastomer resin (A) to the PEI-based resin (B) was changed to (A)/(B)=1/99 (Comparative Example 2).

However, in the manufacturing process, the engaging element cannot be pulled out from the cavity, the cavity is clogged with the resin, and about 30% of the engaging elements of the hook-and-loop fastener obtained as shown in FIG. 3 and FIG. 4 was cut in the middle or bent in a direction in which the engaging elements could not be engaged and there was no value as a hook-and-loop fastener without measuring the engaging performance.

In addition, a molded hook fastener was manufactured in the same manner as in Example 1 except that in Example 1, resin pellets of Hytrel 6037 (manufactured by Du Pont-Toray Co., Ltd.) containing 30% by weight of a bromine-based organic fire retardant as the polyester-based elastomer resin (A) were used and the weight ratio (A)/(B) was changed to 75/25 (Comparative Example 3).

TABLE 1

| | | | EXAMPLE 1 | EXAMPLE 2 | EXAMPLE 3 | EXAMPLE 4 |
|---|---|---|---|---|---|---|
| | ELASTOMER RESIN (A) | | PES-BASED | PES-BASED | PES-BASED (CONTAINING FIRE RETARDANT) | PES-BASED (CONTAINING FIRE RETARDANT) |
| | WEIGHT RATIO (A)/(B) | | 10/90 | 5/95 | 50/50 | 65/35 |
| ENGAGING PERFORMANCE | INITIAL PEELING | SHEAR STRENGTH (N/cm$^2$) | 19.8 | 18.6 | 19.6 | 18.8 |
| | | PEELING STRENGTH (N/cm) | 3.04 | 2.95 | 2.80 | 2.78 |
| | 2000 TIMES PEELING | SHEAR STRENGTH (N/cm$^2$) | 15.1 | 11.6 | 14.8 | 14.9 |
| | | PEELING STRENGTH (N/cm) | 2.67 | 2.02 | 1.68 | 2.43 |
| FIRE RETARDANT PERFORMANCE | 12-SECOND VERTICAL FLAME TEST PASSED OR FAILED | | PASSED | PASSED | PASSED | PASSED |
| | 60-SECOND VERTICAL FLAME TEST PASSED OR FAILED | | PASSED | PASSED | PASSED | PASSED |
| FUMING PERFORMANCE | FUMING DENSITY IN FLAME TEST (D s) | | 62 PASSED | 59 PASSED | 121 PASSED | 157 BARELY PASSED |

Furthermore, a molded hook fastener was manufactured in the same manner as in Example 1 except that in Example 1, the hook fastener was manufactured with 100% of the polyester-based elastomer resin (A) without mixing the PEI-based resin at all and resin pellets of Hytrel 6037 (manufactured by Du Pont-Toray Co., Ltd.) containing 30% by weight of a bromine-based organic fire retardant as the polyester-based elastomer resin (A) were used (Comparative Example 4).

The engaging performance, fire retardant performance, and fuming performance of each of the molded hook fasteners obtained in these Comparative Examples 1, 3 and 4 were measured. The results are shown in Table 2. In Table 2, PES stands for a polyester-based elastomer. In addition, the PEI-based resins used in Comparative Examples 2 and 3 are all polysiloxane-polyetherimide copolymers.

9011 (manufactured by SABIC Company) as the polyetherimide-based resin (B) and Hytrel 6037 (manufactured by Du Pont-Toray Co., Ltd.) containing 30% by weight of a bromine-based organic fire retardant as the polyester-based elastomer were used in Example 1, and the weight ratio (A)/(B) was changed to 50/50. Although cutting and deformation of the engaging element occurred slightly during molding, such a phenomenon did not become a serious problem in terms of process passability and the like.

The engaging performance of the resulting molded hook fastener was as follows: initial shear strength of 16.9 N/cm$^2$, peel strength of 2.38 N/cm, shear strength of 11.4 N/cm$^2$ after 2,000 times peeling, peel strength 2.11 N/cm, which was slightly inferior to that of Example 3 but satisfied the requirements sufficiently as a fixing material for aircraft interior materials. Regarding fire retardant performance as

TABLE 2

| | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| ELASTOMER RESIN (A) | | PES-BASED | PES-BASED | PES-BASED (CONTAINING FIRE RETARDANT) | PES-BASED (CONTAINING FIRE RETARDANT) |
| WEIGHT RATIO (A)/(B) | | 100/0 | 1/99 | 75/25 | 100/0 |
| ENGAGING PERFORMANCE | INITIAL SHEAR PEELING STRENGTH (N/cm$^2$) | 12.0 | UNABLE TO MOLD. AS SUCH, UNABLE TO EVALUATE. | 17.7 | 18.8 |
| | PEELING STRENGTH (N/cm) | 1.25 | | 2.89 | 2.85 |
| | 2000 TIMES SHEAR STRENGTH (N/cm$^2$) | 11.2 | | 14.1 | 17.2 |
| | PEELING PEELING STRENGTH (N/cm) | 1.15 | | 2.19 | 2.40 |
| FIRE RETARDANT PERFORMANCE | 12-SECOND VERTICAL FLAME TEST PASSED OR FAILED | FAILED | UNABLE TO EVALUATE | PASSED | PASSED |
| | 60-SECOND VERTICAL FLAME TEST PASSED OR FAILED | FAILED | | PASSED | PASSED |
| FUMING PERFORMANCE | FUMING DENSITY IN FLAME TEST (Ds) | 92 PASSED | | 204 FAILED | 211 FAILED |

From the results in Table 2, it is difficult to mold the hook-and-loop fastener when the mixing ratio of the polyester-based elastomer is lower than the range of the present invention, and when the mixing ratio of the polyester-based elastomer is higher than the range of the present invention, the polyester-based elastomer used in the case of containing a fire retardant could not satisfy the fuming performance though such polyester-based elastomer could pass on fire retardant performance.

Comparative Example 5

An attempt to manufacture a molded hook fastener was made in the same manner as in Example 1 except that the polyester-based elastomer resin (A) was replaced with a styrene-based elastomer (SEPTON S2006 manufactured by Kuraray Co., Ltd.). However, when the engaging element was pulled out from the cavity in the manufacturing process, the engaging element was cut in the middle, the cavity was clogged with the resin, and the molding itself of the hook-and-loop fastener was difficult without measuring the engaging performance.

Example 5

A molded hook fastener was manufactured in the same manner as in Example 1 except that resin pellets of Ultem well, the molded hook fastener passed the 12-second vertical flame test and 60-second vertical flame test, and the fuming performance was 117 (Ds). Thus, both test results were satisfactory.

This application is based on Japanese Patent Application No. 2016-193524 filed on Sep. 30, 2016, the contents of which are included in the present application.

In order to express the present invention, the present invention has been appropriately and fully described by way of embodiments with reference to specific examples and the like in the above; however, it is to be recognized that those skilled in the art can readily make changes and/or modifications on the above-described embodiments. Therefore, it is to be interpreted that the changed modes or modified modes carried out by those skilled in the art are encompassed within the scope of the rights of the claims unless those changed modes or modified modes are at a level that departs from the scope of the rights of the claims set forth in the claims.

INDUSTRIAL APPLICABILITY

The present invention has a wide range of industrial applicability in a technical field relating to a hook-and-loop fastener and a method of attaching a ceiling material or the like using the same.

The invention claimed is:

1. A molded hook fastener, comprising:
a substrate; and
engaging elements projecting from a surface of the substrate,
wherein both the substrate and the engaging elements comprise a resin composition comprising a polyester-based elastomer resin (A) and a polyetherimide-based resin (B) in a weight ratio (A)/(B) in a range of 2/98 to 70/30.

2. The molded hook fastener of claim 1, wherein the resin composition does not comprise a bromine-based or phosphorus-based organic fire retardant, and the weight ratio (A)/(B) is in a range of 2/98 to 20/80.

3. The molded hook fastener of claim 1, wherein the resin composition comprises 5 to 40% by weight of a bromine-based or phosphorus-based organic fire retardant, with respect to an amount of (A), and the weight ratio (A)/(B) is in a range of 10/90 to 60/40.

4. The molded hook fastener of claim 1, wherein the polyetherimide-based resin (B) is a polysiloxane-polyetherimide copolymer resin.

5. The molded hook fastener of claim 1, wherein
the engaging elements projecting from the surface of the substrate are arranged in rows, and
each of the engaging elements comprises a stem portion projecting from the substrate, and a protrusion portion projecting from a tip or a middle of the stem portion in a direction of the rows.

6. The molded hook fastener of claim 5, wherein
in each row, the protrusion portions of engaging elements project in a first projecting direction, and
the protrusion portions of engaging elements in at least one adjacent row project in a second projecting direction opposite to the first projecting direction.

7. A method of attaching a ceiling material, a wall material or a floor material to a structural material, the method comprising
contacting the molded hook fastener of claim 1 with the structural material and with the ceiling material, the wall material or the floor material,
wherein the structural material may be a structural material of an aircraft.

* * * * *